(12) United States Patent
Ling et al.

(10) Patent No.: US 12,145,172 B2
(45) Date of Patent: Nov. 19, 2024

(54) MANUFACTURING PROCESS OF SILICONE GLOVE

(71) Applicant: Zhejiang Deyan New Materials Technology Co. Ltd., Shaoxing (CN)

(72) Inventors: Congwu Ling, Shaoxing (CN); Yanqing Zhu, Shaoxing (CN); Chen Ling, Shaoxing (CN); Hongjin Zhang, Shaoxing (CN)

(73) Assignee: Zhejiang Deyan New Materials Technology Co. Ltd., Shaoxing (CN)

( * ) Notice: Subject to any disclaimer, the term of this patent is extended or adjusted under 35 U.S.C. 154(b) by 69 days.

(21) Appl. No.: 17/989,718

(22) Filed: Nov. 18, 2022

(65) Prior Publication Data

US 2023/0081043 A1    Mar. 16, 2023

(30) Foreign Application Priority Data

Aug. 8, 2022   (CN) .......................... 202210947328.9

(51) Int. Cl.
| | | |
|---|---|---|
| *A41D 19/04* | (2006.01) | |
| *B05D 1/00* | (2006.01) | |
| *B05D 1/02* | (2006.01) | |
| *B05D 7/02* | (2006.01) | |
| *B05D 3/02* | (2006.01) | |

(52) U.S. Cl.
CPC ............. *B05D 1/002* (2013.01); *B05D 1/02* (2013.01); *B05D 7/02* (2013.01); *B05D 3/0254* (2013.01); *B05D 2518/10* (2013.01)

(58) Field of Classification Search
CPC ....... B05D 1/002; B05D 1/02; B05D 2518/10
See application file for complete search history.

(56) References Cited

U.S. PATENT DOCUMENTS

| | | | |
|---|---|---|---|
| 2005/0108806 A1 | 5/2005 | Llorente Lecue | |
| 2006/0048268 A1 | 3/2006 | Loos | |
| 2007/0053958 A1* | 3/2007 | Neuser ................. | A61K 36/899 424/443 |
| 2010/0095428 A1 | 4/2010 | Fisher | |

FOREIGN PATENT DOCUMENTS

JP          2002088542       *    3/2002

* cited by examiner

*Primary Examiner* — Nathan T Leong
(74) *Attorney, Agent, or Firm* — Hemisphere Law, PLLC; Zhigang Ma

(57) ABSTRACT

The present disclosure relates to a manufacturing process of a silicone glove, the silicon glove is divided into a liner, a glove blank and a silicon layer from the inside to the outside, and liquid silicon is sprayed on a surface of the glove blank for once; when spraying the liquid silicon, the glove blank also rotates around its axis while horizontally moving on an assembly line; during spraying, a liquid silicon outflow channel at least includes a finger gap spraying port and a tiger mouth spraying port that are arranged fixedly; an arranging length of the finger gap spraying port is greater than or equal to a length of a finger area of the glove blank; an arranging length of the tiger mouth spraying port is greater than or equal to a length of a tiger mouth area of the glove blank.

9 Claims, 8 Drawing Sheets

MANUFACTURING PROCESS OF SILICONE GLOVE

TECHNICAL FIELD

The present disclosure belongs to the technical field of glove processing, in particular relates to a manufacturing process of a silicone glove.

BACKGROUND

With excellent characteristics of high and low temperature resistance, steaming and boiling resistance, water vapor resistance and green and environmental protection, silicone may still keep stable property and process flexibility in an environment of higher than 200° C. and lower than −50° C., so the silicone is widely applied in food contact, kitchen ware sealing, infant nipples and other products. Due to these excellent properties, the silicon is also applied in the glove field continuously.

At present, the silicon glove product on the market is mainly divided into two types in terms of the process: the first type is injection molding, namely, the silicon is injected into a mold cavity by adopting an injection molding machine, and then the silicon is demolded after vulcanization molding; and the process is relatively simple, but with poor hand feeling and inconvenient use. The second type is to uniformly coat a layer of silicon on a textile surface by leaching, soaking, etc., and the silicon is demolded after vulcanization; the product has excellent hand feeling and convenient use, and the product may also match with a functional liner, so that the glove has the functions of cold protection, heat insulation, knife resistance, puncture resistance and the like, and therefore the second process is adopted on the market.

In the above second process, a secondary silicon spraying method is usually adopted to coat silicon on a textile surface. For example, a manufacturing method of a silicon groove with the patent No. CN201611079092.2, a palm surface of a glove mold faces upwards firstly, finger ends of the glove mold turn upwards, and a silicon slurry is sprayed to the finger ends of the glove mold for the first spraying so as to ensure that the silicon slurry is uniformly covered among the finger gaps. Then the glove mold is adjusted to a horizontal position, and the glove mold rotates axially; the silicon slurry is continuously sprayed on a surface of the glove mold for the second slurry spraying, so that the silicon slurry is adhered on the whole glove mold to form a glove blank. The operation of this manufacturing process is relatively complex, and each silicon glove needs to be sprayed with slurry for twice when being manufactured, with great sizing material consumption, high manufacturing cost and long process time.

SUMMARY

The technical problem to be solved by the present disclosure is to provide a manufacturing process of a silicon glove, which may implement covering a silicon slurry on a surface of a glove blank through once spraying, and ensures the uniform covering of the silicon slurry in finger gaps and a tiger mouth of a glove blank, thereby saving the sizing material consumption and reducing cost.

According to a manufacturing process of a silicon glove provided by the present disclosure, the silicon glove is divided into a liner, a glove blank and a silicon layer from the inside to the outside, and liquid silicon is sprayed on the surface of the glove blank for once; when spraying the liquid silicon, the glove blank also rotates around its axis while horizontally moving on an assembly line; during spraying, a liquid silicon outflow channel at least includes a finger gap spraying port and a tiger mouth spraying port that are arranged fixedly; an arranging length of the finger gap spraying port is greater than or equal to a length of a finger area of the glove blank; and an arranging length of the tiger mouth spraying port is greater than or equal to a length of a tiger mouth area of the glove blank.

As a further improvement of the present disclosure, the manufacturing process further includes a silicon blowing step, which includes fingertip silicon blowing and surface silicon blowing; when performing the fingertip silicon blowing, the glove blank keeps a horizontal state and axial rotation after completing the silicon spraying; and the glove blank is subjected to blowing treatment by using compressed air, and the blowing direction is from a fingertip to a finger root;

when performing the surface silicon blowing, the glove blank is arranged perpendicularly and downwards and keeps the axial rotation; and the glove blank is subjected to blowing treatment by using the compressed air, and the blowing direction is perpendicular to a length direction of the glove blank.

As a further improvement of the present disclosure, the manufacturing process further includes a cooling step; the glove blank is perpendicularly immersed into a coolant during cooling, the coolant covers the surface of the glove blank, so as to perform cooling treatment on the glove blank; and the coolant may permeate into the glove blank for expansion through a liquid leakage port on the surface of the glove blank, and the coolant permeating into the glove blank is presented on the surface of the glove blank in a pattern form.

As a further improvement of the present disclosure, the manufacturing process further includes a silicon drying step, and the glove blank enters a drying oven for drying after completing spraying; and before the glove blank enters the drying oven, a clamp controls the horizontal arrangement of the glove blank in a length direction, and controls a glove mold to rotate at least one round around an axial direction.

As a further improvement of the present disclosure, an inlet and an outlet of the drying oven are all provided with heat insulation plates, which have the ability of heat preservation and heat insulation, and the heat insulation plates prevent a high temperature in the drying oven from being delivered to the areas of other steps to affect the work of other areas.

As a further improvement of the present disclosure, all the steps are carried out in a thermostat, and the temperature of the thermostat is kept at 15° C.-20° C.

As a further improvement of the present disclosure, in the surface silicon blowing step, a moving gear is sleeved at a periphery of a support rod of the clamp for clamping the glove blank, the moving gear is horizontally arranged and fixedly connected to the support rod, and the moving gear is coaxial with the support rod so that the rotation of the moving gear can drive the rotation of the support rod in the same direction; stationary gears are uniformly arranged on a conveyor belt assembly line track; and during work, the moving gear is in meshing drive with the stationary gears, so that the glove blank has the ability of keeping axial rotation when being transported.

As a further improvement of the present disclosure, the manufacturing process further includes a pre-processing step, before spraying the glove blank, the surface of the glove blank is subjected to flaming treatment by using a flame gun, so as to remove burr on the surface of the glove blank.

As a further improvement of the present disclosure, the manufacturing process further includes a liner sleeving step; the liner is sleeved on the glove mold, and after hot melt adhesive is dipped to each fingertip of the glove blank, the glove blank is sleeved at the periphery of the liner so that the fingertip of the liner is adhered to an inner wall of the fingertip of the glove blank; and after the glove blank is transported to the drying oven of 120° C. and the hot melt adhesive is molten, the glove blank is away from the drying oven, parallel to a horizontal plane and keeps the axial rotation, the glove blank is subjected to blowing treatment by using the compressed air, and the blowing direction is from the fingertip to the finger root.

Compared with the prior art, the present disclosure has the following beneficial effects: the purpose of covering the silicon slurry on the surface of the glove blank through once spraying may be implemented through the fit design of a long opening and a through hole of a slurry spraying groove, and the uniform covering of the silicon slurry in the finger gaps and the tiger mouth of the glove blank is ensured, thereby saving the sizing material consumption and reducing cost.

After spraying slurry, the glove mold is kept at a horizontal state and away from the slurry spraying area, and when the silicon slurry on the surface of the glove blank is blown to the finger root from the fingertip by using the compressed air, liquid globules adhered to the fingertips are blown to be broken, thereby avoiding the situation that the silicon slurry is not covered on the fingertips due to the liquid globules adhered to the fingertips, and ensuring the surface finish of the fingers;

after the liquid globules adhered to the fingertips of the glove mold are blown to be broken, a clamp controls the glove mold to go straight down, and axial rotation and blowing in a silicon dipping area are kept, so as to ensure that no liquid globules are adhered to the glove surface, and to improve the surface finish of the glove;

before the glove mold enters the drying oven for drying, the clamp controls the horizontal arrangement of the glove mold in a length direction and controls the glove mold to rotate at least one round around the axial direction, so that the silicon slurry on the surface of the glove blank is uniformly distributed, and the silicon slurry liquid globules on the surface of the glove blank are avoided to be dried by the drying oven directly after the glove mold enters the drying oven directly, thereby resulting in uneven shape defects on the glove surface;

when the glove blank is cooled by the coolant, the coolant may detect whether the glove blank is leakproof. If the glove blank is not leakproof, the coolant will leave an obvious sign near a liquid leakage port, so that a worker can screen a flawed glove blank in time, thereby ensuring the yield of the glove and improving the quality of the glove finished product;

after fingertip glue is dripped inside the glove blank, the glove blank and the inner side are fixed in a manner that the glove blank is sleeved outside the liner, with simple steps and high production efficiency;

the inlet and the outlet of the drying oven are all provided with the heat insulation plates, which prevent the high temperature in the drying oven from escaping outside while keeping the high temperature in the drying oven, and the influence of the high temperature on the process flow in other areas is avoided after the high temperature is delivered to other areas;

and the silicon glove produced by the present disclosure has obtained American FDA Certification, American ASTM F1358-16 Fireproof Certification, EN388:2016 Anti-cutting Level-4 Certification, EN407:2022 Contact Heat Level-4 Certification, EN511:2006 Cold Resistance Contact −50° C. Certification, EN374 Level-6 Certification and the like, and passed FFGB testing, and the glove has high property, skid and wearing resistance and high practicability.

Figure 1:
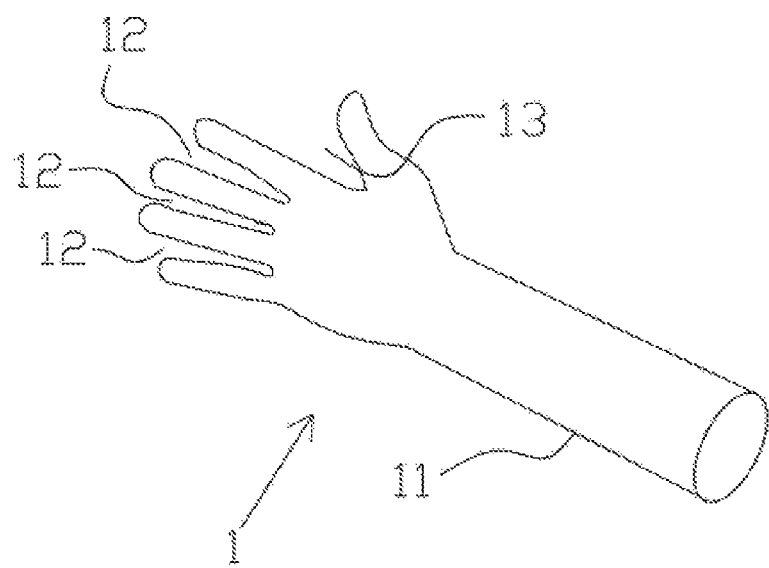
FIG. 1 is a structural schematic diagram of a silicon glove of the present disclosure.

Reference signs in the drawings:
1. Glove blank, 11. Palm, 12. Finger gap, 13. Tiger mouth finger gap, 21. Finger gap spraying port, 22. Tiger mouth spraying port.

DETAILED DESCRIPTION OF THE EMBODIMENTS

Figure 2:
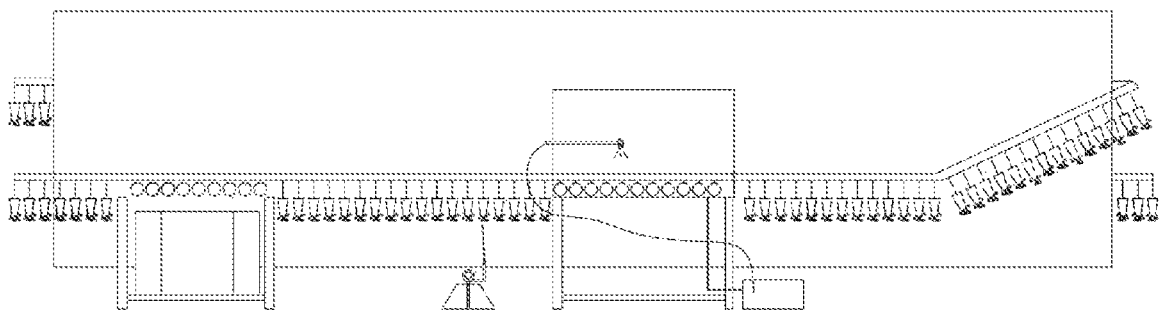
FIG. 2 is a front view of an assembly line for manufacturing a silicon glove of the present disclosure.
Figure 3:
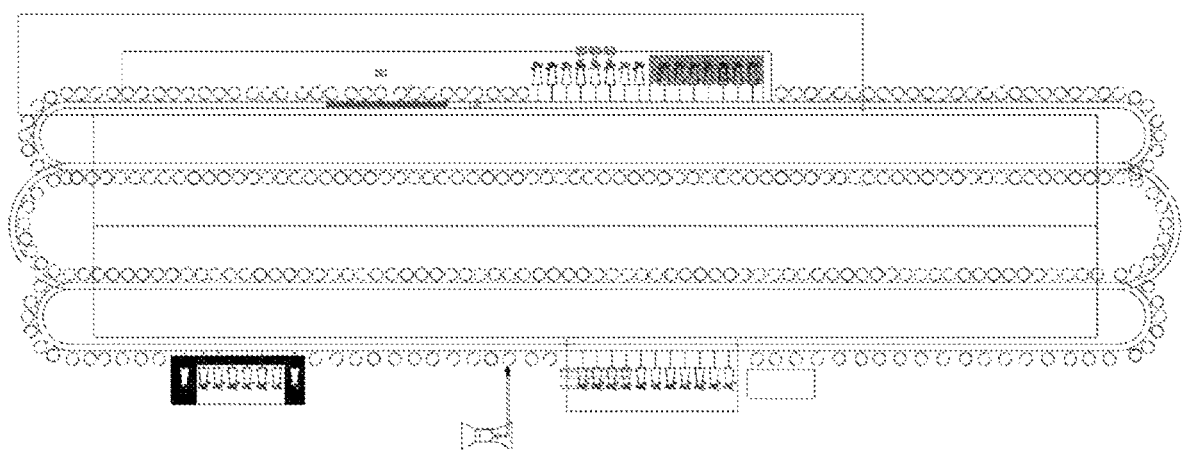
FIG. 3 is a top view of an assembly line for manufacturing a silicon glove of the present disclosure.
Figure 4:
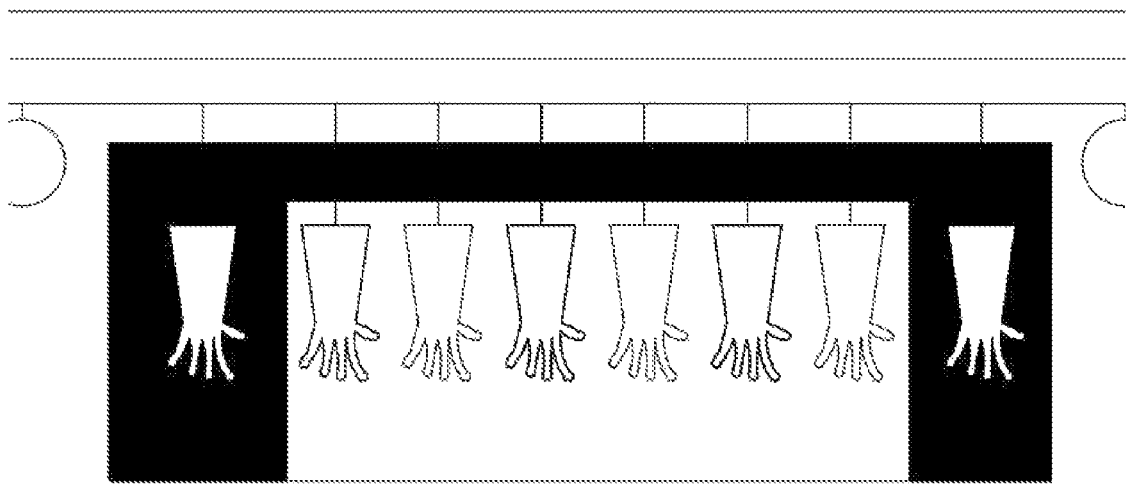
FIG. 4 is a top view of a glove blank pre-processing area of the present disclosure.
Figure 5:
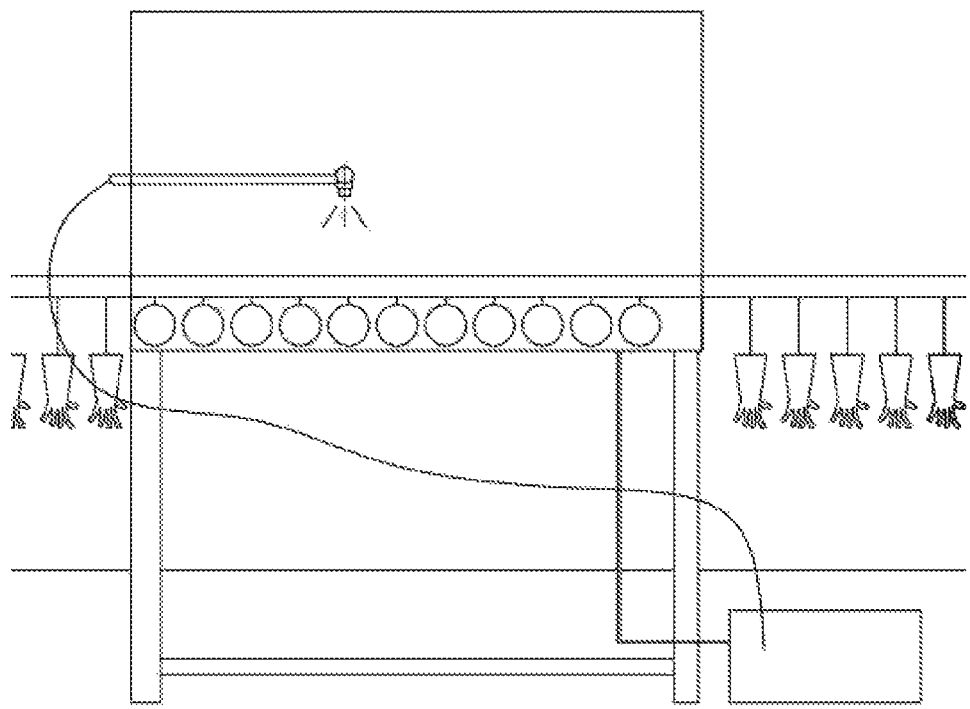
FIG. 5 is a front view of an anti-penetration drying area of the present disclosure.
Figure 6:
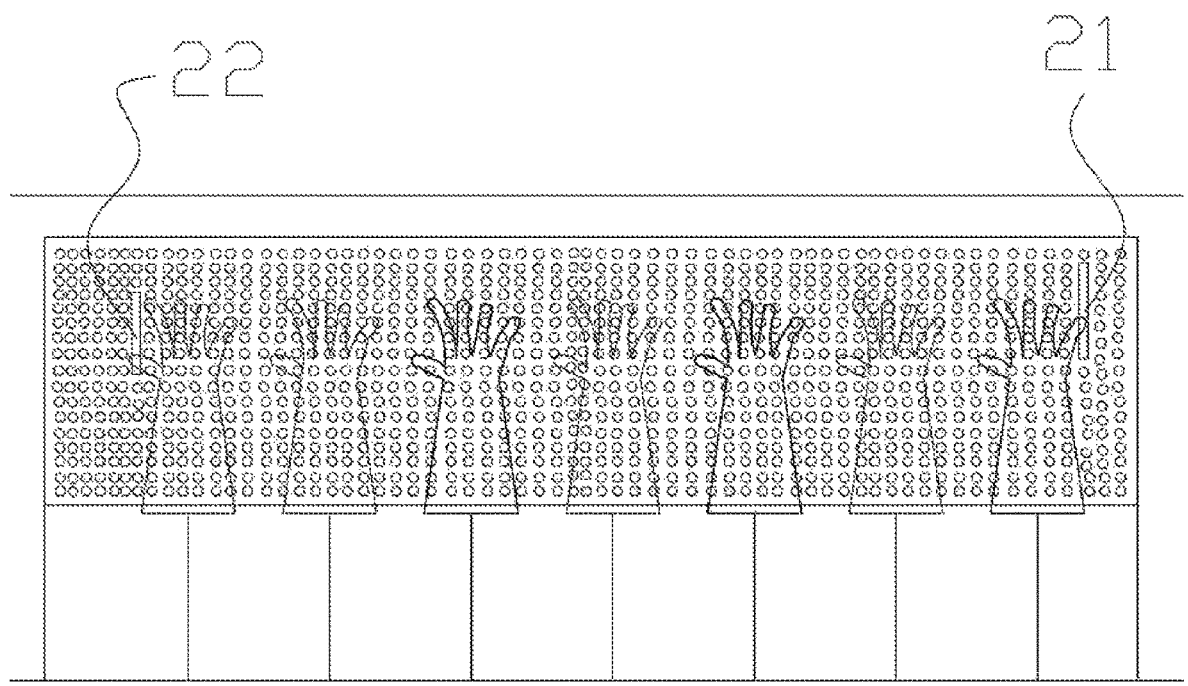
FIG. 6 is a top view of a silicon spraying area of the present disclosure.
Figure 7:
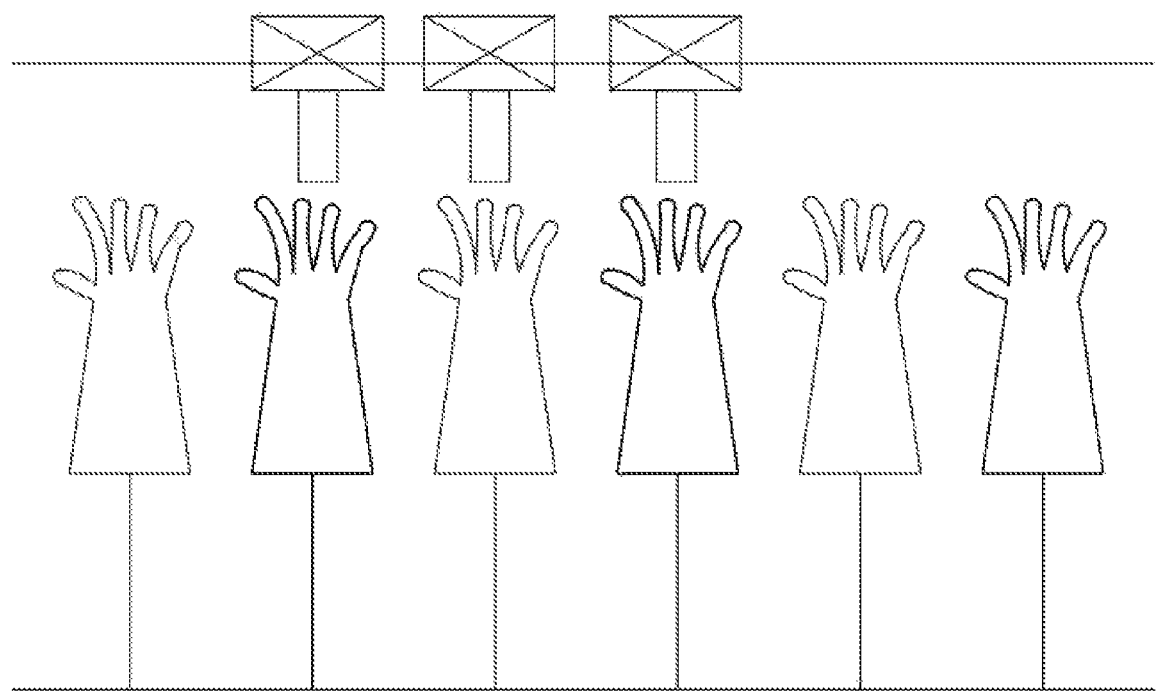
FIG. 7 is a top view of a blowing area after spraying silicon of the present disclosure.
Figure 8:
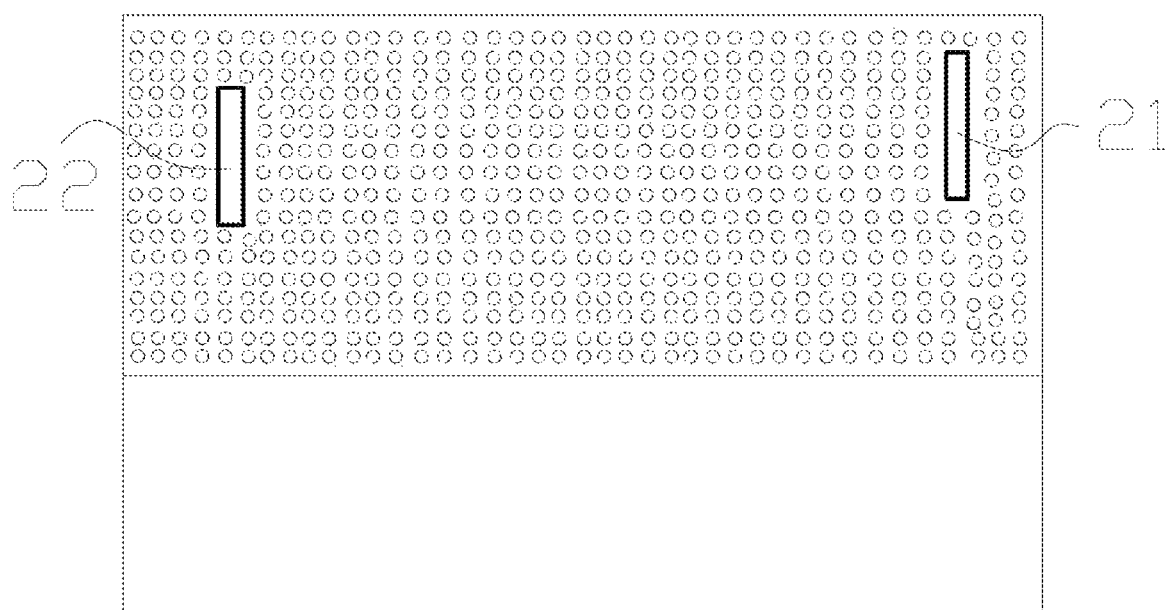
FIG. 8 is a structural schematic diagram of a slurry spraying groove of the present disclosure.

Specific embodiment I: please refer to FIG. 1 to FIG. 8, a manufacturing process of a silicon glove, including the following steps:

(1) Pre-processing of a glove blank: a glove mold is fixed on a clamp of an assembly line, the glove blank 1 is sleeved on the glove mold, and a clamp controls the glove mold to be set in parallel to a plane; and before the glove blank is subjected to a process of spraying a protective solution, burr on a surface of the glove blank 1 is turned through a flame gun, so that the surface of the glove blank 1 trends to be flat, and uniform covering is easily implemented when spraying the protective solution on the glove blank 1 and other operations in follow-up steps;

(2) Coating the protective solution: the clamp controls the glove mold to be vertically downward, and the glove mold moves forwards along the assembly line and enters the area for coating the anti-permeation liquid; the glove mold keeps vertical and downward in the area for coating the anti-permeation liquid, and keeps axial rotation; a machine controls a hairbrush to smear the anti-permeation liquid uniformly on the surface of the glove blank 1, wherein the anti-permeation liquid is specifically an environment-friendly waterproof and oil-proof agent with a mass percent of 3 wt %, the machine smears the surface of the glove blank in turn, and the glove blank 1 after being smeared with the anti-permeation liquid moves forwards along the assembly line and leaves the area for coating the anti-permeation liquid;

(3) Drying treatment: the glove mold enters the drying area on the assembly line, and after being dried for 1 min at 150° C., the glove blank 1 leaves the drying area along the assembly line;

(4) Slurry spraying: after the clamp controls the glove blank 1 to be set in parallel to the plane, the glove blank 1 rotates along its axial direction and enters the slurry spraying area along the assembly line; when the glove mold just enters the slurry spraying area, the silicon slurry in the slurry spraying groove sprays slurry downwards in a waterfall form, at this time, the silicon slurry at least covers the outer surface of the glove blank 1 near the finger gap 12 between a little finger and a ring finger, the finger gap 12 between an index finger and a middle finger, and the finger gap 12 between the middle finger and the ring finger;

when the glove mold is transported in the slurry spraying area, the glove mold keeps the rotation around its axial direction, and at this time, the silicon slurry is sprayed to the surface of the glove blank 1 by through holes on the surface of the slurry spraying groove. Since the glove mold is rotary, the silicon slurry covers the surface of an anti-permeation layer on the surface of the whole glove blank 1 so as to form a glove workblank;

when the glove mold is transported to an outlet part, the silicon slurry in the slurry spraying groove sprays slurry again downwards in a waterfall form, and at this time the silicon slurry performs all-round spraying on the surface of the glove blank 1 near the tiger mouth finger gap 13, so as to ensure that the outer surface near each finger gap of the glove blank 1 is all uniformly covered with the silicon slurry;

(5) Fingertip silicon blowing: the glove mold leaves the slurry spraying area in a horizontal state, the glove mold enters the fingertip silicon blowing area, the glove workblank blown to the surface of the glove blank 1 through the compressed air is subjected to blowing treatment for 2 min in the fingertip silicon blowing area, the blowing direction of the compressed air is from the fingertip of the glove blank 1 to the finger root during a blowing process, the glove mold keeps the axial rotation during the blowing process, with the purposes of blowing and damaging liquid globules adhered to the fingertips during the slurry spraying process, and preventing the situation that the silicon slurry is not covered on the fingertips due to the liquid globules adhered to the fingertips of the glove blank 1. At the same time, the silicon slurry on the glove blank 1 is blown to the finger root from the fingertip in the fingertip silicon blowing area, so as to prevent forming a bulge after cooling due to the existence of the liquid globules, and to ensure the surface finish and uniformity of the fingers of the glove blank 1;

(6) Surface silicon blowing: the glove mold leaves the fingertip silicon blowing area, and the glove mold enters the surface silicon blowing area after the clamp controls the glove mold to go straight down; the glove mold keeps the axial rotation, the glove workblank blown to the surface of the glove blank 1 through the compressed air is subjected to blowing treatment for 2 min in the surface silicon blowing area, the blowing direction of the compressed air is perpendicular to the length direction of the glove blank 1 during the blowing process, with the purpose of blowing and damaging liquid globules adhered to the surface of the glove blank 1 during the slurry spraying process, and improving the surface finish of the glove;

(7) Silicon drying: the glove mold leaves the surface silicon blowing area; before the glove mold enters the drying oven, the clamp controls the glove mold to be horizontally arranged in a length direction, and controls the glove mold to rotate at least one round around the axial direction; the glove mold firstly enters the drying oven of 90° C. to be dried for 15 min along the product assembly line, then enters the drying oven of 110° C. to be dried for 15 min, and finally enters the drying oven of 128° C. to be dried for 20 min; and during the drying process, the glove mold always rotates with the extension line in its length direction as the axis;

(8) Cooling: after the glove blank 1 is dried, the glove mold leaves the drying oven; and at this time, a heat insulation plate is arranged between the drying oven and the cooling area, the heat insulation plate has the heat insulation ability, thereby preventing the high temperature in the drying oven from being delivered to the cooling area, resulting in adverse effect on the cooling effect in the cooling area;

after the clamp controls the glove mold to be vertical, the glove mold sleeved with the glove blank 1 is immersed into the coolant directly below, so that the whole glove blank 1 is completely immersed in the coolant for cooling treatment, and the time of the cooling process is not less than 2 min; when the glove blank 1 is completely immersed in the coolant, the coolant covers the surface of the glove blank 1; and if a liquid leakage port exists on the surface of the glove blank 1, the coolant stretches into the glove blank 1 and expands through the liquid leakage port, and the coolant immersed inside the glove blank 1 is presented on the surface of the glove blank 1 in a pattern form;

after the cooling is finished, the clamp controls the glove blank 1 to leave the coolant vertically, the surface of the glove blank 1 without the liquid leakage port is finish without obvious patterns; and the patterns generated after penetrating the coolant may be seen on the surface of the glove blank 1 with the liquid leakage port;

the worker can check the situation of the glove blank 1 in turn; if the worker observes that the surface of the glove blank 1 is smooth without obvious patterns, the glove blank 1 is recorded as "qualified"; if the worker observes that the surface of the glove blank 1 has obvious patterns, showing that the glove blank 1 has the liquid leakage port, and the worker records the glove blank 1 as "unqualified"; and the worker screens the unqualified glove and feeds the qualified glove in the next process, so as to ensure the yield of the glove finished product;

(9) Sleeving liner: take down the glove blank 1, and the liner is sleeved on the glove mold; after hot melt adhesive is dipped to each fingertip in the glove blank 1, the glove blank 1 is sleeved on the glove mold and sleeved at the periphery of the liner, and at this time the fingertip of the liner is adhered to the inner wall of the fingertip of the glove blank 1;

(10) Baking and heating: the glove mold sleeved with the liner and the glove blank 1 at the same time is transported to the drying oven of 120° C. to be baked for 10 min, and the hot melt adhesive at the joint of the liner and the glove blank 1 is molten to liquid at a high temperature of 120° C.;

(11) Blowing: the glove mold leaves the dying oven, the clamp controls the glove mold to be parallel to the plane, at this time, the compressed air is controlled to blow the glove blank 1, and the blowing direction of the compressed air is from the fingertip to the finger root of the glove blank 1 during the blowing process. The glove mold keeps rotation during the blowing process, with the purpose of blowing the molten glue on the inner wall of the fingertip of the glove blank 1, so that the adhesion area of the glove blank 1 and the liner is increased, and the connection of the glove blank 1 and the liner is more stable;

(12) Cooling: after the clamp leaves the blowing area and controls the glove mold to be vertical, the glove mold sleeved with the glove blank 1 is immersed into the coolant directly blow, so that the whole glove blank 1 is completely immersed in the coolant for cooling treatment, thereby ensuring the cooling and solidification of the hot melt adhesive in the glove blank 1 and the adhesion between the glove blank 1 and the liner;

(13) Edge covering and trimming: after the liner exceeding the glove blank 1 is trimmed, the glove blank 1 is fixedly connected to an inlet of the liner.

It is noted that the slurry spraying groove is arranged in the slurry spraying area, a plurality of through holes are formed in the surface of the slurry spraying groove, the plurality of through holes are uniformly and intensively distributed in the slurry spraying groove. When the silicon slurry is added in the slurry spraying groove, the silicon slurry leaks to the lower side of the slurry spraying groove uniformly from the through holes. The slurry spraying grove is arranged just above the movement assembly line of the glove mold, so that when the glove mold enters the slurry spraying area along the assembly line, the silicon slurry is sprayed to the surface of the glove blank 1 below the slurry spraying groove from the through holes of the slurry spraying groove, thereby achieving the purpose of fully covering the outer surface of the glove blank 1 through the silicon slurry;

A finger gap spraying port 21 is formed in one side of the slurry spraying groove, the finger gap spraying port 21 is a long opening and arranged at one side of the slurry spraying groove, the position of the finger gap spraying port 21 corresponds to that of the finger gap 12 between the little finger and the ring finger when the glove blank 1 enters the slurry spraying area, and the length of the finger gap spraying port 21 is equal to or greater than that of the finger area of the glove blank 1, so that the silicon slurry is sprayed on the surface of the glove blank 1 around the finger gap 12 from the finger gap spraying port 21 in a waterfall form when the palm 11 of the glove blank 1 enters the slurry spraying area upwards, and the silicon slurry is completely adhered to the surface near the finger gap 12 along the rotation of the glove blank 1, so as to ensure that the silicon slurry can be uniformly covered on the surface of the glove blank 1 near the finger gap 12, and no dead angle exists during spraying;

the height of the finger gap 12 between the index finger and the middle finger on the glove blank 1 and the finger gap 12 between the middle finger and the ring finger is similar to that of the finger gap 12 between the little finger and the ring finger, and the silicon slurry sprayed out of the finger gap spraying port 21 can also perform all-around spraying on the outer surface of the glove blank 1 near the finger gap 12 between the index finger and the middle finger and the finger gap 12 between the middle finger and the ring finger;

a tiger mouth spraying port 22 is formed in the other side of the slurry spraying groove, the tiger mouth spraying port 22 is a long opening and arranged at one side, away from the finger gap spraying port 21, of the slurry spraying groove, the position of the tiger mouth spraying port 22 corresponds to that of the tiger mouth finger gap 13 when the glove blank 1 leaves the slurry spraying area, and the length of the tiger mouth spraying port 22 is greater than or equal to that of the tiger mouth area of the glove blank 1. When the glove blank 1 enters the slurry spraying area, since the position of the tiger mouth finger gap 13 is lower than that of other finger gaps 12, all-around spraying cannot be performed on the surface of the glove blank 1 near the tiger mouth finger gap 13 when the finger gap spraying port 21 works. Therefore, the tiger mouth spraying port 22 needs to be set; when the glove blank 1 passes through the tiger mouth spraying port 22, the silicon slurry is sprayed on the surface of the glove blank 1 near the tiger mouth finger gap 13 from the tiger mouth spraying port 22 in a waterfall form, and the silicon slurry is completely adhered to the surface near the tiger mouth finger gap 13 along the rotation of the glove blank 1, so that the silicon slurry can be uniformly covered on the surface of the glove blank 1 near the tiger mouth finger gap 13

Therefore, the specific slurry spraying steps are as follows:

S51: the clamp controls the glove blank 1 to be set in parallel to the plane, and controls the glove blank 1 to rotate around its axial direction and to enter below the slurry spraying groove; the glove blank 1 is subjected to simultaneous spraying of the silicon slurry from the through holes of the slurry spraying groove and the finger gap spraying port 21; the silicon slurry passing through the through holes is sprayed to the palm and the back of the glove blank 1, the silicon slurry passing through the finger gap spraying port 21 is sprayed to the surface of the glove blank 1 near the finger gap 12 between the little finger and the ring finger in a form of waterfall spraying; with the continuous axial rotation of the glove blank 1, the silicon slurry in the waterfall form performs all-around spraying near the finger gap 12 between the little finger and the ring finger, the finger gap 12 between the middle finger and the ring finger and the finger gap 12 between the index finger and the middle finger in turn, so that the silicon slurry is uniformly covered on the outer surface of the glove blank 1 near the finger gap 12. Since the position of the tiger mouth finger gap 13 is lower than that of other finger gaps 12, the part that is not sprayed also exists on the outer surface of the glove blank 1 near the tiger mouth finger gap 13;

S52: the glove blank 1 leaves the spraying area of the finger gap spraying port 21, the glove blank 1 moves uniformly below the slurry spraying groove, and the glove blank 1 keeps the axial rotation; the silicon slurry in the slurry spraying groove is sprayed to the glove blank 1 through the through holes on the surface of the slurry spraying groove and uniformly covers the whole anti-permeation surface on the surface of the glove blank 1; at this time, the part that is not sprayed also exists on the outer surface of the glove blank 1 near the tiger mouth finger gap 13;

S53: when the glove blank 1 is transported below the tiger mouth spraying port 22, the glove blank 1 is subjected to simultaneous spraying of the silicon slurry from the through holes of the slurry spraying groove and the tiger mouth finger spraying port 22; the silicon slurry passing through the through holes is sprayed to the palm and the back of the glove blank 1, the silicon slurry passing through the tiger mouth finger spraying port 22 is sprayed to the surface of the glove blank 1 near the tiger mouth finger gap 13 in a form of waterfall spraying; with the rotation of the glove blank 1, the silicon slurry in the waterfall form performs all-around spraying on the surface near the tiger mouth finger gap 13, so that the silicon slurry is uniformly covered on the surface of the glove blank 1 near the tiger mouth finger gap 13.

It is noted that a moving gear is arranged on the support rod of the clamp for clamping the glove mold, the moving gear is horizontally arranged and fixedly connected to the support rod, the moving gear is coaxial with the support rod, and the moving gear rotates and drives the support rod to rotate in the same direction; stationary gears are uniformly arranged on the assembly line conveyor belt, during work, the moving gear is in meshing drive with the stationary gears, and when the moving gear controls the glove mold to be transported on the assembly line conveyor belt, the moving gear drives the glove mold and the stationary gears to rotate in the same axial direction;

For example, in the silicon dripping step, the moving gear on the support rod of the clamp for clamping the glove mold is in meshing drive with the stationary gears on the conveyor belt, so as to keep the axial rotation of the glove mold when controlling the glove mold to be transported in the silicon dripping area, to ensure that all directions of the glove blank 1 can be blown by the compressed air, thereby ensuring the finish surface of the glove blank 1 and more uniform glove thickness.

It is noted that: in the silicon drying step, before the glove mold enters the drying oven, the glove mold needs to rotate at least one round around the axial direction, so that the silicon slurry on the surface of the glove blank 1 is uniformly distributed, and the silicon slurry liquid globules on the surface of the glove blank 1 are avoided to be dried by the drying oven directly after the glove mold enters the drying oven directly, thereby resulting in uneven shape defects on the glove surface.

It is noted that the steps of slurry spraying, silicon blowing and silicon dripping are all carried out in the thermostat, and the temperature in the thermostat is kept at 15° C.-20° C., so as to prevent more sizing material consumption due to quick or slow drying of the silicon slurry in a climate of high temperature or low temperature, resulting in the waste of the silicon slurry; and the silicon slurry keeps the undried state in a constant temperature environment, so that the silicon slurry is easy to be blown uniformly in the steps of silicon blowing and silicon dripping, thereby ensuring the yield of the product.

It is noted that an inlet and an outlet of the drying oven are all provided with heat insulation plates, which have the ability of heat preservation and heat insulation, and the heat insulation plates can seal the drying oven, to keep the high temperature in the drying oven, so that the glove blank 1 in the drying oven can be baked continuously; the heat insulation plates can prevent the heat in the drying oven from being delivered outside, prevent a high temperature in the drying oven from being delivered to the cooling area, thereby affecting the cooling effect of the cooling area on the glove blank 1; and the cooling efficiency is improved.

The above embodiments are subjected to the product performance testing, and the results are as follows:

(1) American FDA Testing

| Used simulant | Time | Temperature | Maximum allowable value limit of temperature | Total extract | Comment |
|---|---|---|---|---|---|
| Distilled water | 7.0 h | Reflux temperature | 20 mg/inch$^2$ | 0.5 mg/inch$^2$ | Pass |
| Follow-up extract of distilled water | 2.0 h | Reflux temperature | 1 mg/inch$^2$ | 0.5 mg/inch$^2$ | Pass |
| Normal hexane | 7.0 h | Reflux temperature | 175 mg/inch$^2$ | 18.7 mg/inch$^2$ | Pass |
| Follow-up extract of normal hexane | 2.0 h | Reflux temperature | 4 mg/inch$^2$ | 0.5 mg/inch$^2$ | Pass |

As shown in the table, by detecting the content of the total extract of the glove under four simulants of the distilled water, the follow-up extract of the distilled water, the normal hexane and the follow-up extract of normal hexane, and the content of the total extract is all less than the maximum allowable value limit of the temperature in this simulant, therefore the silicon glove produced by the manufacturing process of the silicon glove provided by the present disclosure is harmless to the human body.

(2) EN388 Anti-Cutting Level-4 Testing

| Level | Level-0 | Level-1 | Level-2 | Level-3 | Level-4 |
|---|---|---|---|---|---|
| Tearing strength resistance/N | <10 | 10 | 25 | 50 | 75 |

The adopted standard is EN388: 2016+A1: 2018 standard. During testing, the palm of the silicon glove produced by the present disclosure is taken as a sample, to detect that the tearing strength resistance is greater than 75n, reaching the EN388 anti-cutting testing level-4 standard, so the anti-tearing strength is high.

(3) American Fireproof Testing

The silicon glove produced by the manufacturing process of the silicon glove provided by the present disclosure has passed American ASTM F1358-16 fireproof certification, showing that the fireproof property of the silicon glove conforms to the industrial standards, wherein the process of the American ASTM F1358-16 fireproof certification is as follows:

| Part | Testing item | Assessment |
| --- | --- | --- |
| 13.1 | The report sample is tested according to the testing method F1358, to confirm the tested material, the material manufacturer or its source and application are indicated; the material specification is provided, indicating which surface is exposed in the flame. | Pass |
| 13.2 | For each testing sample, thee following measurement and observation are reported. | Pass |
| 13.2.1 | Flammable | Pass |
| 13.2.2 | Within 12 s of flame exposure time, if the sample is ignited, the combustion time, the persistence time and the combustion distance | Pass |
| 13.3 | For each tested material, the report is as follows: | Pass |
| 13.3.3 | Sample quantity not be ignited in any flame exposure time, and | Pass |
| 13.3.4 | Average combustion characteristic exposing after 3 s; | Pass |
| 13.3.4.1 | Persistence time, and | Pass |
| 13.3.4.2 | Average combustion distance | Pass |
| 13.3.5 | Average combustion characteristic exposing after 12 s; | Pass |
| 13.3.5.1 | Persistence time, and | Pass |
| 13.3.5.2 | Average combustion distance | Pass |

It is noted that the contents in the above table are merely partial process of American ASTM F1358-16 fireproof certification rather than all.
(4) EN407 Heat Insulation Testing

| Contact heat | | |
| --- | --- | --- |
| Threshold time Tt at 100° C. | s | 78.4 |
| Threshold time Tt (2) at 100° C. | s | NA |
| Threshold time Tt (3) at 100° C. | s | NA |
| Standard difference at 100° C. | s | 0.0 |
| Threshold time Tt at 250° C. | s | 24.3 |
| Threshold time Tt (2) at 250° C. | s | NA |
| Threshold time Tt (3) at 250° C. | s | NA |
| Standard difference at 250° C. | s | 0.0 |
| Threshold time Tt at 350° C. | s | 18.9 |
| Threshold time Tt (2) at 350° C. | s | 17.1 |
| Threshold time Tt (3) at 350° C. | s | 17.9 |
| Standard difference at 350° C. | s | 0.9 |
| Threshold time Tt at 500° C. | s | 13.9 |
| Threshold time Tt (2) at 500° C. | s | 13.5 |
| Threshold time Tt (3) at 500° C. | s | 13.7 |
| Standard difference at 500° C. | s | 0.2 |

The adopted standard is the European Union protective glove standard 407: 2020, and the data in the table is the value of partial contact heat testing obtained according to EN ISO 12127: 2015 heat contact testing method. According to the testing data, the silicon glove produced by the manufacturing process of the silicon glove provided by the present disclosure has reached EN 407: 2020 contact heat level-4 standard, with high heat insulation property.
(5) The silicon glove produced by the manufacturing process of the silicon glove provided by the present disclosure has passed EN511 cold contact resistance testing, and the property of the glove is not affected at −50° C., and without penetration of cool air, the silicon glove reaches the EN511: 2006 standard.
(6) LFGB (VOM) Volatile Matter Testing

| Testing item | Limit | Unit | MDL | |
| --- | --- | --- | --- | --- |
| Time | — | s | — | 4.0 |
| Temperature | — | ° C. | — | 200 |
| Volatile organic matter (VOM) | 0.5 | % (w/w) | 0.1 | |

The silicon glove produced by the manufacturing process of the silicon glove provided by the present disclosure has passed LFGB (VOM) testing, and when testing a polyester liner, the testing result is that the VOM is less than 1%, proving that the glove does not contain toxic substances, has little volatility and is harmless to the human body.
(7) In the testing of preventing dangerous chemical and microorganism, the silicon glove produced by the manufacturing process of the silicon glove provided by the present disclosure has reached EN374 level-6 standard, with high properties of preventing dangerous chemical and microorganism.

What is claimed is:
1. A manufacturing process of a silicon glove, wherein the silicon glove comprises a liner, a glove blank (1) and a silicon layer from inside to outside, the manufacturing process comprises spraying liquid silicon onto a surface of the glove blank (1) in a single pass to form the silicon layer;
wherein, when spraying the liquid silicon, the glove blank (1) is controlled to keep rotating around its vertical axis in a length direction of glove blank while horizontally moving on an assembly line;
wherein, during spraying, a liquid silicon outflow channel at least comprises a first spraying port (21) configured to spray the liquid silicon onto outer surfaces of the glove blank near a gap between each two adjacent fingers and a second spraying port (22) configured to spray the liquid silicon onto outer surfaces of the glove blank near a gap between a thumb and an index finger; a length of the first spraying port (21) is greater than or equal to a length of a length of each finger of the glove blank; and a length of the second spraying port (22) is greater than or equal to a length of each of the thumb and the index finger of the glove blank.
2. The manufacturing process of the silicon glove according to claim 1, further comprising blowing the glove blank covered by the liquid silicon, wherein said blowing the glove blank comprises blowing a fingertip of the glove blank and blowing the surface of the glove blank; when performing blowing the fingertip, the glove blank (1) keeps a horizontal state and keeps rotating around its vertical axis after completing the spraying; and the glove blank (1) is subjected to blowing treatment by using compressed air, and a first blowing direction for blowing the fingertip is from the fingertip to a finger root; and
when performing blowing the surface, the glove blank (1) is arranged vertically and keeps rotating around its vertical axis; and the glove blank (1) is subjected to blowing treatment by using the compressed air, and a second blowing direction for blowing the surface is perpendicular to the length direction of the glove blank (1).

3. The manufacturing process of the silicon glove according to claim 2, wherein in the surface silicon blowing step, a moving gear is sleeved at a periphery of a support rod of the clamp for clamping the glove blank (1), the moving gear is horizontally arranged and fixedly connected to the support rod, and the moving gear is coaxial with the support rod so that the rotation of the moving gear is capable of driving the rotation of the support rod in the same direction; stationary gears are uniformly arranged on a conveyor belt assembly line track; and during work, the moving gear is in meshing drive with the stationary gears, so that the glove blank (1) has the ability of keeping axial rotation when being transported.

4. The manufacturing process of the silicon glove according to claim 1, further comprising a cooling step; the glove blank (1) is perpendicularly immersed into a coolant during cooling, the coolant covers the surface of the glove blank (1), so as to perform cooling treatment on the glove blank (1); and if there is a liquid leakage port on the surface of the glove blank, the coolant permeates into the glove blank (1) for expansion through the liquid leakage port on the surface of the glove blank (1) to form a pattern which is used to determine whether the glove blank is qualified.

5. The manufacturing process of the silicon glove according to claim 1, further comprising a silicon drying step, and the glove blank (1) enters a drying oven for drying after completing spraying; and before the glove blank (1) enters the drying oven, a clamp controls the horizontal arrangement of the glove blank (1) in a length direction, and controls a glove mold to rotate at least one round around an axial direction.

6. The manufacturing process of the silicon glove according to claim 5, wherein an inlet and an outlet of the drying oven are all provided with heat insulation plates, which have the ability of heat preservation and heat insulation, and the heat insulation plates prevent a high temperature in the drying oven from being delivered to the areas of other steps to affect the work of other areas.

7. The manufacturing process of the silicon glove according to claim 1, wherein all the steps are carried out in a a temperature range of 15° C.-20° C.

8. The manufacturing process of the silicon glove according to claim 1, further comprising a pre-processing step, before spraying the glove blank (1), the surface of the glove blank (1) is subjected to flaming treatment by using a flame gun, so as to remove burr on the surface of the glove blank (1).

9. The manufacturing process of the silicon glove according to claim 1, further comprising sleeving the liner onto the glove blank; wherein said sleeving the liner comprises:
   sleeving the liner on a glove mold;
   dripping hot melt adhesive into each fingertip inside the glove blank (1);
   sleeving the glove blank (1) on the periphery of the liner so that the fingertip of the liner is adhered to an inner wall of the fingertip of the glove blank (1);
   moving the glove blank (1) into a drying oven of 120° C. to have the hot melt adhesive molten;
   moving the glove blank (1) out from the drying oven, and keeping the glove blank parallel to a horizontal plane and controlling the glove blank to keep rotating around its vertical axis; and
   blowing the glove blank (1) using a compressed air, wherein a blowing direction is from the fingertip to the finger root.

\* \* \* \* \*